United States Patent Office 3,342,022
Patented Sept. 19, 1967

3,342,022
FILTRATION CELL
René Donguy, Bagneux, and André Roguin, Antony, France, assignors to Commissariat à l'Energie Atomique, Paris, France
Filed Nov. 5, 1964, Ser. No. 409,055
Claims priority, application France, Nov. 11, 1963, 953,983
4 Claims. (Cl. 55—356)

The present invention relates to filtration cells and especially, although not exclusively, to cells which are intended for the purpose of filtering gases under pressure containing radioactive aerosols in suspension, and also to the vessels for receiving and storing the filter elements of such cells.

The replacement of filter elements which have become clogged or contaminated by radioactive products sets problems which essentially arise from the fact that handling operations must be performed only from a distance; in particular, this requirement makes it desirable to simplify as far as possible the operations which involve the locking and above all the unlocking of a filter element on the support unit to which said filter element is secured inside the cell.

The present invention is directed to the design of a cell in which the filter element is secured to the support unit by means of a locking device, the uncoupling of which is carried out automatically at the time of insertion of the unit within a vessel (hereinafter referred-to as a "transfer can") which is intended to receive the filter element and the coupling of which is effected automatically as and when a new filter element is taken by insertion of the support unit within the transfer can which contains said filter element.

To this end, the invention proposes a filtration cell designed especially for the purpose of filtering gas under pressure which contains radioactive aerosols in suspension, characterized in that said filtration cell comprises a support unit which forms part of a leak-tight filter container consisting of a number of separable components and a device for securing the filter element to the support unit, said device comprising a tubular member which is integral with said support unit and which is provided with movable locking components, an extension which is formed on said filter element and which can be inserted in said tubular member, said extension being fitted with means for receiving said locking components, a member for operating said locking components which is movable parallel to said extension between a first position in which said operating member maintains said locking components engaged with said extension and a second position in which said operating member frees said locking components, and elastic means for thrusting back the operating member towards the first position, said operating member being integral with a casing which surrounds the filter element and the length of which is such that said casing projects from said support unit when the operating member occupies the first position thereof, with the result that said casing thrusts back said operating member towards the second position when said casing comes into contact with cooperating means arranged for this purpose within a transfer can designed to receive the filter and when the assembly consisting of support unit and filter element are inserted within said transfer can.

The description which now follows relates to one mode of practical application of the invention which is given by way of example and not in any limiting sense, reference being made to the accompanying drawings, in which.

Figure 1:
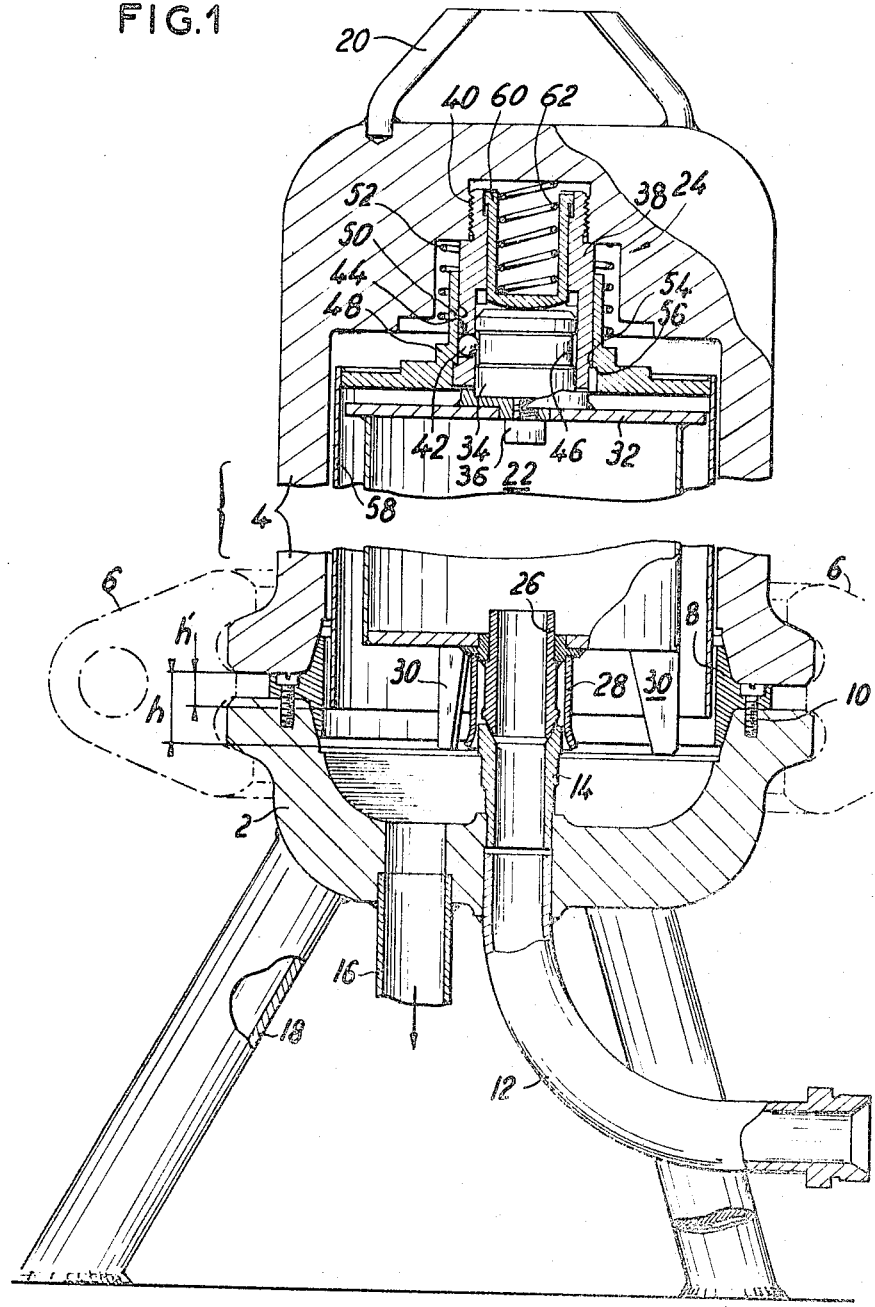
FIG. 1 shows a filtration cell in cross-section taken along a vertical plane of symmetry.

The filtration cell which is illustrated in FIG. 1 comprises a leak-tight filter container consisting of a base 2 and a support unit 4 which are coupled together in leak-tight manner by detachable means such as a clamping collar 6 as shown in chain-dotted lines. Said clamping collar is advantageously formed of two half-shells which are assembled together by means of bolts, the clamping action of which applies two opposite frustoconical faces of the parts 2 and 4 against a ring 8 which is tapered on two sides and which is coupled to the base 2 by means of screws 10. The conicity of the ring is different from that of the opposite faces in order to ensure leak-tightness.

The base 2 is provided with an axial pipe 12 for the supply of gas, said pipe terminating in an end-piece 14 having a top face for accommodating the filter element and of frusto-conical shape for the purpose of ensuring leak-tightness of the joint. The base 2 is also provided with a pipe 16 for the discharge of filtered gas. The base which is illustrated is provided with three feet 18 on which the cell unit as a whole is supported.

The support unit 4 constitutes the upper part of the filter container. Said support unit completely surrounds the filter element which will be described hereinafter and can constitute a shield for affording protection against gamma radiation during transportation of the filter element when this latter is contaminated. The support unit 4 is fitted at the top portion thereof with one or a number of lugs 20 so that said unit may thus be handled by means of a pulley-block.

The filter element 22 which is removably secured to the support unit 4 by means of a locking device which is generally designated by the reference numeral 24 is provided at the bottom portion thereof with an inlet nozzle 26, the underface of which is hemispherical for the purpose of providing a leak-tight contact with the frusto-conical wall of the nozzle 14. The said nozzle can be provided with a top projection for the purpose of preventing any downward return of dust particles. It will thus be apparent that the different components ensure leak-tightness of the filter container on the one hand and the separation of the upstream end from the downstream end of the filter element on the other hand.

A deflector 28 surrounds the nozzle and makes it possible to initiate the centering of said nozzle at the time of assembly of the filtration cell. Three feet 30 which are secured to the bottom wall of the filter serve to support this latter when it is placed within a transfer can, as will be explained below, and eliminate any risk of damage to the nozzle 26. The said feet project to a distance $h$ below the support unit 4.

The filter element is fixed onto a top plate 32 to which is secured, for example by means of a screw 36, a cylindrical extension 34. The locking device 24 which will now be described couples the filter element 22 to the support unit 4 through the intermediary of said extension 34.

The device 24 is essentially composed of a sleeve which carries the locking components and an operating member. The tubular sleeve 38 which carries the locking components is fixed (for example screwed) in a blind-end bore 40 which is formed for this purpose in the base of the support unit 4. A number of different types of locking components can be employed such as, for example, rocking levers. In the form of embodiment which is illustrated, these components consist of three balls 42 which are designed to run in cylindrical radial raceways or grooves 44 formed for this purpose in the sleeve 38 and which are retained by a cage (not shown). When said balls project into the interior of the counterbore which is formed in the sleeve 38, said balls engage in an annular channel 46 formed for this purpose in the cylindrical extension 34 and accordingly imprison said extension.

The balls which project radially within the counterbore of the sleeve are held in position by means of an operating member 48 consisting of a bushing 50 which is slidably mounted over the sleeve 38 and a cylindrical casing 58. A locking spring 52 which is compressed between a shoulder of the bore 40 and the bushing 50 thrusts back this latter into a bottom position (in which it is shown in FIG. 1) wherein a bottom shoulder 54 of the bushing is in contact with an abutment face 56 which is formed for this purpose on the sleeve 38. The result thereby achieved is that, as long as a mechanical force which is sufficient to lift the operating member 48 is not applied on the cylindrical casing, the spring 52 maintains the filter element 22 imprisoned within the support unit 4.

The cylindrical casing 58 which is attached to the bushing 48 by any suitable means and which serves to control the operating member is inserted between the lateral wall of the support unit 4 and the periphery of the filter element 22. In order to permit control of the operating member at the time of insertion of the support unit within a transfer can, the cylindrical casing projects below the support unit to a distance $h'$ which is shorter than the distance $h$ of projection of the feet of the filter element when the element is in the bottom position, as shown in FIG. 1.

In order to ensure leak-tightness of the coupling between the nozzles 14 and 26, the imprisoning coupling of the filter element 22 is provided with a certain play (achieved as a result of widening of the annular channel 46); a thrust-member 60 fitted with a spring 62 which is applied against the end of the bore of the support unit 4 is designed to exert on the extension 34 a force which applies the nozzles against each other.

Figure 2:
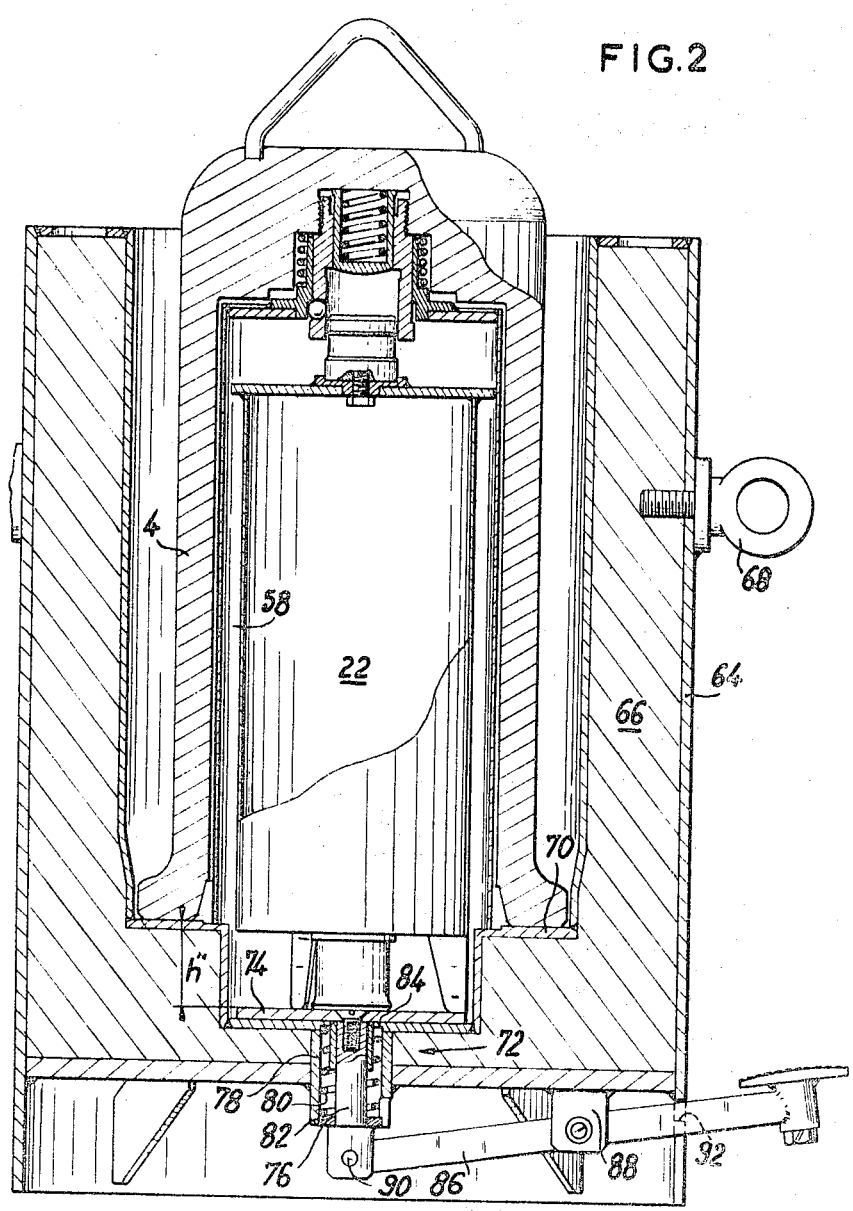
FIG. 2 shows a filter element transfer can in cross-section taken along a vertical plane of symmetry, the component parts of said transfer can being shown in the positions which they must occupy in order to initiate the separation of the support unit from the filter element.
Figure 3:
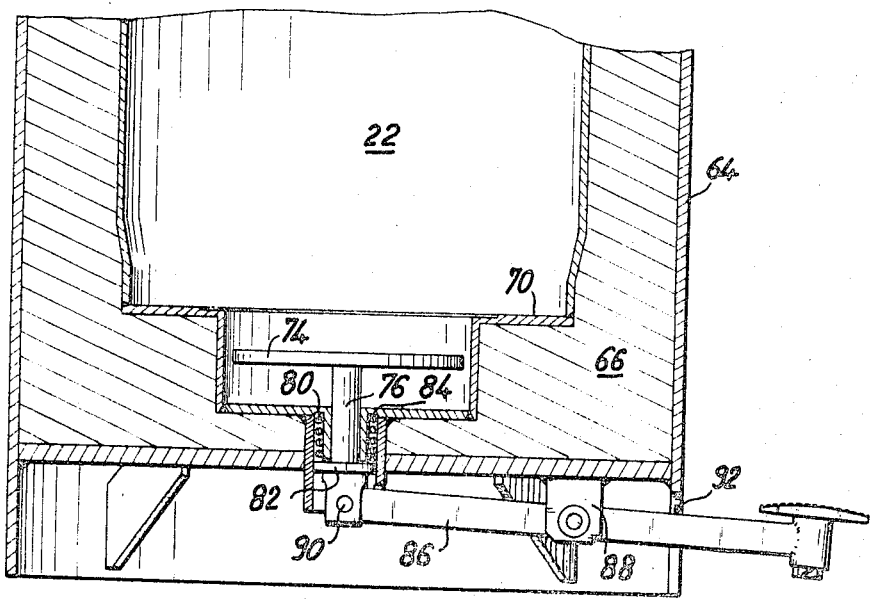
FIG. 3 is a detail view in cross-section taken along the same plane as FIG. 2, the component parts of the transfer can being shown in the positions which they occupy for the purpose of initiating the coupling of a filter element to a support unit.

The transfer can, or can for receiving and storing the filter element as shown in FIGS. 2 and 3, is essentially composed of an enclosure 64 which is open at the top and which comprises a sufficient thickness of shielding material 66. Rings such as the ring 68 serve for the purpose of handling the can.

The bottom of the transfer can is provided with an annular step 70 and is equipped with a mechanism which is generally designated by the reference numeral 72 and which serves to initiate at will either the uncoupling of a filter element from its support unit at the time of insertion of this latter or the coupling of a filter element to the support unit at the time of withdrawal.

As shown in FIG. 2, the annular step 70 has an internal diameter such that, at the time of insertion of the support unit 4, the underface of said support unit and the bottom rim of the cylindrical casing 58 come into contact with the step, whilst the filter element 22 is capable of passing beyond the step so as to come to rest on the bottom.

The mechanism 72 essentially consists of a plate 74 carried by a plunger 76 which is adapted to slide within a passageway 78 formed for this purpose through the base of the transfer can in the center-line of this latter; a return spring 80 which is compressed between a washer 82 carried by the plunger and a flange 84 of the transfer can tends to thrust back the plate towards a bottom position in which it is shown in FIG. 2. In the bottom position in which the plate rests on the base of the can, a distance $h''$ which is greater than the distance $h$ remains between the plate and the step 70.

A control link-rod system which is represented in FIGS. 2 and 3 in the form of a pedal 86 which is pivotally mounted on a lug 88 of the transfer can and pivotally attached to the plunger at 90 makes it possible to lift the plate 74 and to bring it from the bottom position which is shown in FIG. 2 to the top position which is shown in FIG. 3. The slot which provides a passageway for the pedal through the lateral wall of the transfer can is preferably endowed with an elbowed shape so as to provide an abutment 92 for retaining the plate in the top position thereof.

*Operation*

The uncoupling of a filter element from its support unit and the coupling of said support unit to a fresh filter element will now be successively described.

When it is necessary to replace the filter element 22 of a filtration cell, said cell is first of all isolated by closing two shut-off valves (not shown), one of which is mounted in the pipe 12 whilst the other is mounted in the pipe 16. The isolated section which is comprised between the two shut-off valves is then purged, scoured with clean gas and finally (if the filtration was effected under pressure) brought to atmospheric pressure.

The bolt or bolts (not shown) for assembling the two half-shells which constitute the clamping collar 6 are then removed and said collar is withdrawn so as to free the support unit 4. The said support unit is gripped by means of a pulley-block, lifted, then brought to a position vertically above an empty transfer can, the mechanism 72 of which occupies the position shown in FIG. 2. The combined assembly consisting of support unit and filter element is then lowered inside the can. The cylindrical casing 58 is the first component to come into contact with the step 70 and rises with respect to the support unit 4 progressively as this latter moves downwards under the action of its own weight to the level $h'$ which corresponds to the abutting contact of the support unit. This relative movement is accompanied by the lifting movement of the bushing 50 relatively to the sleeve 38 and the compression of the spring 52. During this movement, the balls 42 come opposite the enlarged portion of the bushing which is located below the shoulder 54 and pass radially outwards, thereby freeing the extension 34. The filter element 22 then falls under gravity and comes to rest on the plate 74 on which it is carried by its three supporting feet 30.

In view of the fact that the gas to be filtered flows inwardly through the filter element 22 from the exterior, the active particles which are stopped by the filter element do not contaminate the interior of the support unit 4 and the cylindrical casing 58; once the said support unit has been freed from the clogged filter element, said support unit can be employed again after positioning of a fresh filter element which may be either new or reconditioned.

The assembly operation which consists in coupling a filter element to a support unit takes place in a manner which is similar to the disassembly operation. The new filter element is placed within a transfer can, the mechanism 72 of which is brought into the position shown in FIG. 3. The support unit to be fitted with a filter is lowered into the transfer can. The sleeve 38 comes over the extension 34 progressively as the downward motion takes place, whereupon the cylindrical casing 58 and the support unit come to rest on the step 70. In this position, the locking device 24 is disarmed and allows the extension 34 to pass through. As and when the support unit is moved upwards by means of a pulley-block, said support unit moves over the distance $h-h'$ without carrying with it the cylindrical casing, the relative displacement of which during this time initiates the locking of the filter element. Subsequent lifting operations are exactly the reverse of the disassembly operations which have previously been described.

By way of example, it can be mentioned that filtration cells of the type hereinabove described have been constructed for the purpose of filtering particles smaller than one micron in suspension in a gas under a pressure of the order of 60 bars and at a temperature which can reach 400° C. The filtration material employed was sintered stainless steel which ensured a relatively small pressure loss (less than 100 millibars in respect of a filtration area of 2250 cm.$^2$ and in respect of a flow rate of 200 g./s. of carbon dioxide gas). The use of stainless steel in all the component parts of the filter element furthermore made it possible to recondition this latter by chemical processing. Finally, the construction of the support unit 4 in the form of a stainless steel bell afforded protection against direct gamma radiation in the event of contamination of the filter.

What we claim is:

1. Filtration cell comprising a support unit which forms part of a leak-tight filter container having a filter element and consisting of a number of separable components and a coupling device for securing the filter element to the support unit, said device comprising a tubular member which is integral with said support unit and which is provided with movable locking components, an extension which is formed on said filter element and which can be inserted in said tubular member, said extension being fitted with means for receiving said locking components, a member for operating said locking components which is movable parallel to said extension between a first position in which said operating member maintains said locking components engaged with said extension and a second position in which said operating member frees said locking components, said operating member being thrust back by elastic means towards the first position and provided with abutment means so constructed and arranged to thrust back said operating member towards the second position when said abutment means come into contact with cooperating means arranged for this purpose in a transfer can for receiving the filter and when the assembly consisting of support unit and filter element are inserted within said transfer can.

2. Filtration cell in accordance with claim 1, wherein the abutment means of said operating member is constituted by a casing which surrounds the filter element and the length of which is such that said casing projects from said support unit when the operating member occupies the first position thereof.

3. Filtration cell in accordance with claim 1, wherein said coupling device is provided with a certain play and comprises elastic means which are interposed between the support unit and the filter element so as to move said filter element away from said support unit and apply said filter element against a nozzle for the admission of gas to be filtered, said nozzle being disposed within the filter container.

4. Filtration cell in accordance with claim 1, wherein said transfer can for reception and storage comprises an enclosure wherein the bottom of said enclosure consists of a central portion for receiving the filter element and an annular portion for receiving the support unit and said abutment means.

References Cited

UNITED STATES PATENTS 3,032,359    5/1962    Cator _____ 285—316 X

FOREIGN PATENTS 879,158    10/1961    Great Britain.
1,143,279    2/1963    Germany.

REUBEN FRIEDMAN, *Primary Examiner.*

W. S. BRADBURY, *Assistant Examiner.*